Figure 2:
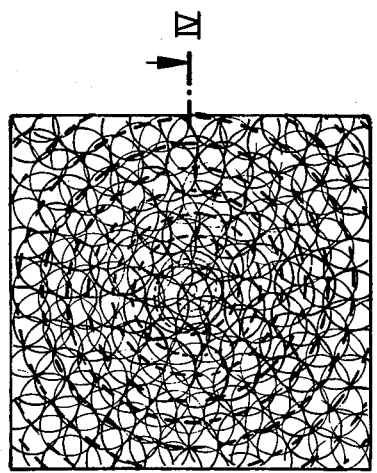

United States Patent [19]

Dini

[11] 3,931,458

[45] Jan. 6, 1976

[54] METHOD AND APPARATUS FOR ENGRAVING ELEMENTAL AREAS OF CONTROLLED VOLUME ON A PRINTING SURFACE WITH AN ENERGY BEAM

[75] Inventor: Mamiliano Dini, Brescia, Italy

[73] Assignee: European Rotogravure Association, Munich, Germany

[22] Filed: Aug. 24, 1973

[21] Appl. No.: 391,255

[30] Foreign Application Priority Data

Aug. 25, 1972 Germany............................ 2241850

[52] U.S. Cl............... 178/6.6 B; 178/6.7 R; 358/75
[51] Int. Cl.²......................................... G03F 7/00
[58] Field of Search ........... 178/6.6 B, 6.6 R, 6.7 R; 358/75

[56] References Cited

UNITED STATES PATENTS

| 3,226,696 | 12/1965 | Dove................................ 178/6.6 B |
| 3,564,130 | 2/1971 | Crooks et al..................... 178/6.7 R |
| 3,564,131 | 2/1971 | Herold et al. ................... 178/6.6 B |
| 3,638,231 | 1/1972 | Poole et al. ....................... 178/6.6 B |
| 3,688,026 | 8/1972 | Odnoko et al. .................. 178/6.7 R |

*Primary Examiner*—Raymond F. Cardillo, Jr.
*Attorney, Agent, or Firm*—Cushman, Darby & Cushman

[57] ABSTRACT

Method and apparatus for engraving the cells of a printing surface to a controlled amount by controlling the spatial distribution and time duration of the trajectory of an energy beam having a cross-section smaller than the cell to be engraved thereby.

19 Claims, 8 Drawing Figures

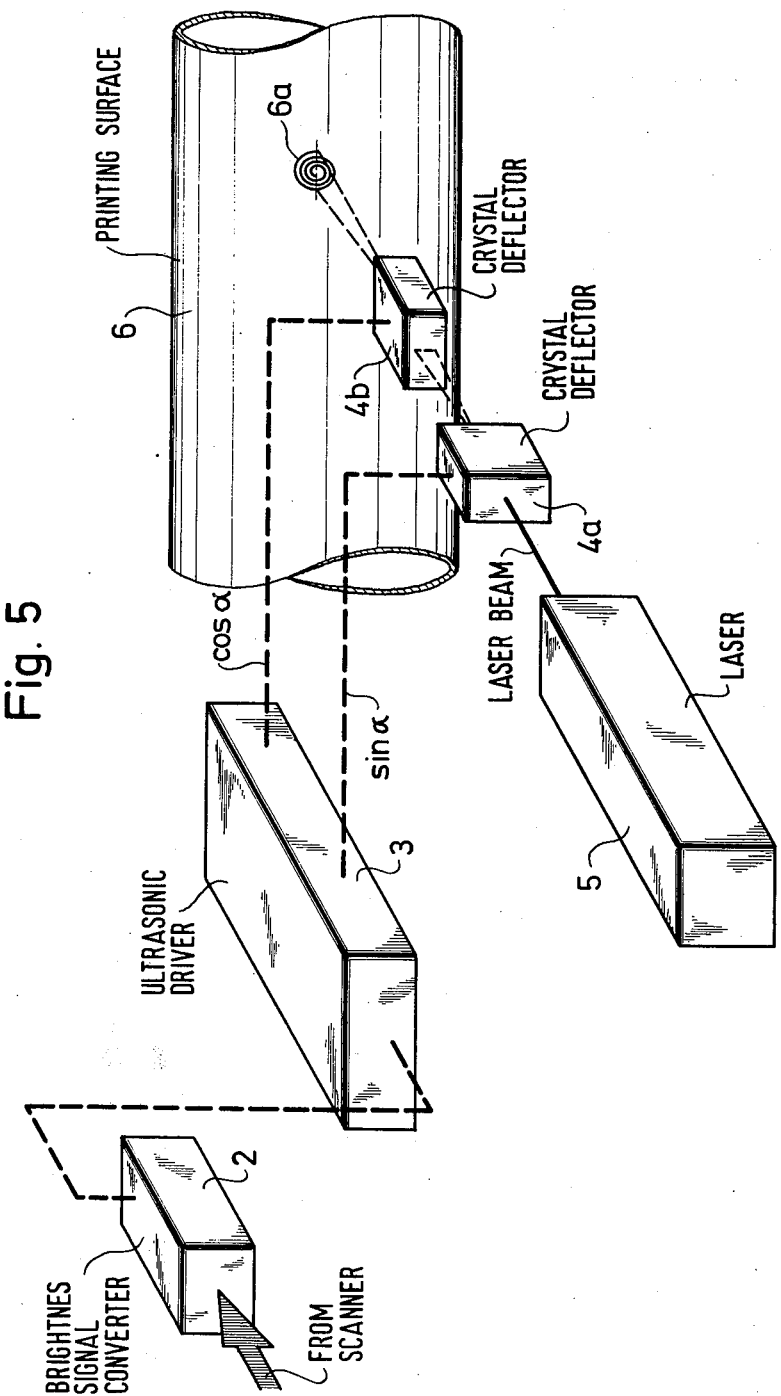

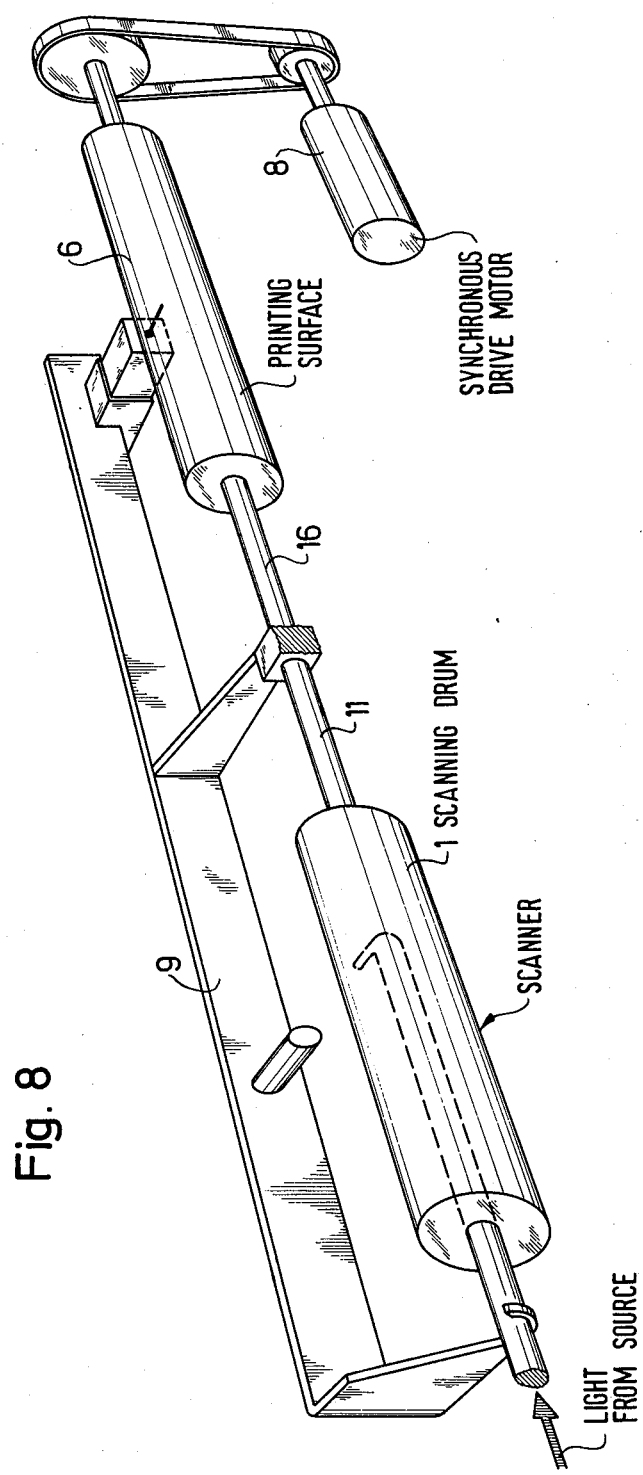

METHOD AND APPARATUS FOR ENGRAVING ELEMENTAL AREAS OF CONTROLLED VOLUME ON A PRINTING SURFACE WITH AN ENERGY BEAM

The present invention relates to method and apparatus for engraving printing plates such as for the production of engraved cells corresponding to the picture or other original to be engraved on a printing surface, by means of energy beams, for example, electron or laser beams.

It is known that rotogravure cylinders can be engraved by means of a laser beam being energy modulated in correspondence with the original, whereby each individual energy impulse serves to produce an engraved cell the planar (linear) dimension and/or depth of which depends on the energy of the impulse. In another known, specific construction, the surface of the printing plate is formed with cells having a depth corresponding to the maximum printing depth required, and are filled with a material adapted to be readily decomposed or evaporated by the laser beam, whereby the intensity and scanning speed of the laser beam are selected such that only the filler material is modulated in depth in accordance with the energy of the individual scanning spots.

However, the range of variation for the modulation of the energy and/or frequency of such energy beam used for the production of engraved cells is limited so that it provides a numerically limited number of depth variations and thus a limited number of tone variations. Such a relatively small number of tone or contrast variations, however, does not allow one to obtain the image quality which is required nowadays especially for color image production.

When it is intended to reproduce all of the contrast graduations by means of a rotogravure cylinder, every cell must show a volume variation on its surface which ranges between zero and a maximum value and which must be present in a great number of steps in order to provide good tone modulation. The transition between successive steps must produce substantially no visible contrast in the case of a continuous tone variation. In order to achieve a tone variation between a maximum and a minimum printing density to produce smooth and, at the same time, clear printing results, the number of tone steps required is on the order of 200; that is, each cell on the surface of the rotogravure cylinder should bear 200 different possible variations of its volume (with respect to area and/or depth).

Now, if one tried to obtain this multi-step contrast scale in the above-described, known manner by means of an energy source emitting continuous pulses, for example by means of a laser beam, the energy and/or frequency of such source would have to be modulated correspondingly, for instance in accordance with as many as 200 different resulting engravures. It should be apparent that this requirement can only be fulfilled with an energy modulation frequency, which in practice, is difficult to obtain.

Now the present invention provides a possibility of solving this object of a multi-step engraving result by means of an energy source, especially by means of a laser beam, the energy and/or frequency of which is graduated to lesser degree or, preferably, not modulated at all, but rather constant, thereby to avoid the above-mentioned difficulties of a multi-step modulation of the energy and/or frequency of the radiation source proper.

Accordingly, the invention resides in a method and apparatus for engraving printing plates by means of energy beams, especially laser beams, one feature of which is that an energy beam (which with respect to its energy and/or frequency is modulated to small degree only or, preferably, not modulated at all) is focused to a fraction of the maximum dimension of an engraved cell, and the surface of each engraved cell is etched along a beam path, the length and/or spatial distribution density of which on the cell surface is modulated in accordance with the tone intensity of the picture or other original at the associated position of the cell.

In the exemplary practial realization of this method, the focused beam is started at one point (preferably in the central region of an engraved cell) and thereafter allowed to pass over the cell surface on a continuous path with the degree or density of spatial distribution of said path on the cell surface being the greater and/or with the adjacent path portions being closer spaced to each other, the higher the density of corresponding locality of the original picture corresponding to such cell position.

Preferably, this continuous path represents a spiral or helix which originates in the center point of the cell. Then, the outer diameter of the spiral corresponds to the degree of distribution, and its pitch corresponds to the density or spacing between its portions. Instead of a spiral path, the energy beam may follow any other path pattern, optionally chosen from several possibilities in consideration of the operational conditions. This principle of the control of the beam path allows the realization of an engraving scale which may comprise any desired number of steps and which even may be substantially continuous.

If the energy beam is focused to a very narrow width and/or has limited energy content, the cell surface as a whole or in sections, for example in the central region thereof, may be scanned by the energy beam more than but once in order to obtain a particularly high etching depth. The corresponding effect is provided, for example, when adjacent portions of the path, for example the center turns of a spiral, are made to adjoin each other with a spacing of less than the beam diameter, a high spatial distribution density results so that local overlap of beam effects the desired results. Alternatively, the spacings between adjacent path portions, for example the spiral pitch, may be increased from the center of the cell in outward direction to produce a lower spatial distribution density.

Obviously, for carrying out the invention, there may be used with particular advantage laser beams of high frequency, i.e., pulsating in the order of megacycles, with relatively small energy contents.

The exemplary embodiment of the invention is based on the following considerations: It may be assumed that, on the one hand, an engraved cell of maximum volume (corresponding to one extreme tone) has a diameter of 120 $\mu$, and, accordingly, a necessary depth of 35 $\mu$, while on the other hand, the minimum size cell (corresponding to the opposite extreme tone) with a just visible printing shade, has a diameter of 30 $\mu$, and a depth of 2 $\mu$, further it may be assumed that on the premises of an ultrasonic modulation of the trace the energy contents of each beam pulse provides an etching effectiveness corresponding to a volume of 200 $\mu^3$. Then the theoretical number of pulses needed to engrave a maximum volume cell is about 2000 pulses and for a minimum volume cell about 700 pulses.

Theoretically, such modulation of frequency or pulsing repetition rate can be achieved. However, it is easily understood that this type of modulation is rather difficult to be obtained in practice at the necessary working frequency. That is, in such case, the number of pulses of constant frequency and energy contents, each acting upon a single cell, is then determined by the period of time during which this high-frequency pulsating beam is allowed to strike the cell.

In order to obtain the maximum etching effectiveness, that is to produce an engraved cell of maximum volume, the beam must strike the area of the cell for the full period of time.

On the other hand, in order to etch or engrave a cell of any intermediate volume, as for instance a middle tone cell, the beam must strike the cell surface only during a portion of the full period of time, and for the rest of the time must be outside of the cell area.

This temporary exclusion of the beam from the cell area can be achieved, for example, by masking it out inside the modulating apparatus.

Since time is the governing factor for modulating the energy distributed on a specific area determined by the cell, improved results could be achieved, for example on the basis of the assumption that the length or duration of the individual pulses could be modulated in such way that different energy levels are concentrated on each single cell during the same period of time each.

Alternatively, it is also possible to modulate the focus of the beam from cell to cell. In such case, during equal effective periods the overall effect of engraving will be dependent also on the energy area distribution of the individual pulses on the area of the cell. This beam focus modulation may be effected, for example, by means of a focusing crystal through which the beam passes and which is activated by a corresponding electronic control circuit.

The bundling of the beam is effected in any of the known and usual methods, for example by using electronically or ultrasonically controlled modulations, for instance, by using crystals for the first methods and interference phenomena for the second methods.

The path pattern followed by the beam may be determined in various ways according to the pattern structure.

In the preferred case of a spiral path pattern, the radius of the spiral and hence the spatial distribution density will be controlled by two deflector systems working at 90° displaced from each other and being properly synchronized. Apparatuses of this type are well known from light ray and electron optics.

In the case of the embodiment of the invention in which the etching beam traverses each engraving cell in a spiral pattern of which the extent corresponds to the tone gradation of the corresponding picture spot of the original the following mathematical basis is valid:

As it is known, the equation of a spiral is $$\ln r = a \cdot \theta \qquad \text{(Equation 1)}$$

wherein $r$ is the radius of the spiral, a the increment of the radius and $\theta$ the beam velocity, that is the angle of the radius. Since the $\theta$ the following equation is valid:

$$\theta = \frac{2 \pi n}{60} = \frac{\pi \cdot n}{30} \qquad \text{(Equation 2)}$$

$n$ being the number of the spiral cycles per second traversed by the etching beam the further result is:

$$\ln r = \frac{\pi \cdot n}{30} \cdot a \qquad \text{(Equation 3)}$$

and $$n = \left(\frac{30 \cdot \ln r}{\pi}\right) \cdot \frac{1}{a} \qquad \text{(Equation 4)}$$

In the exemplary embodiment r corresponds to the half diagonal of the engraving cell and, accordingly, has a fixed value which depends on the cell size which is constant all over the printing area. For the prevailingly usual quadratic cell having an edge length of 120 $\mu$ the value of r is 85 $\mu$. Accordingly, the term in brackets of equation 4 is a geometrical constant, that is:

$$n = k \cdot \frac{1}{a} \qquad \text{(Equation 5)}$$

or, in words, the number of the spiral cycles to be traversed by the etching beam can be controlled by the adjustment of the value of $a$.

Figure 1:
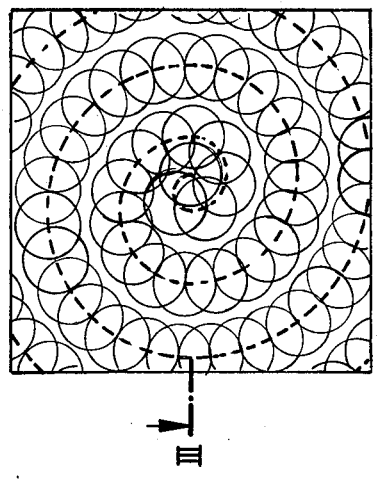
Figure 4:
Figure 3:
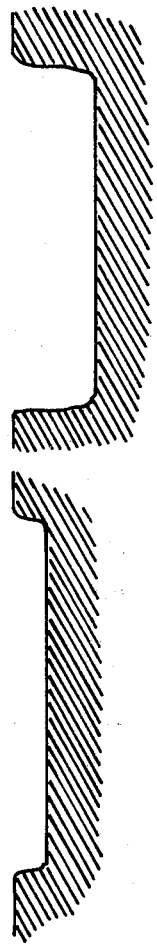
Figure 6:
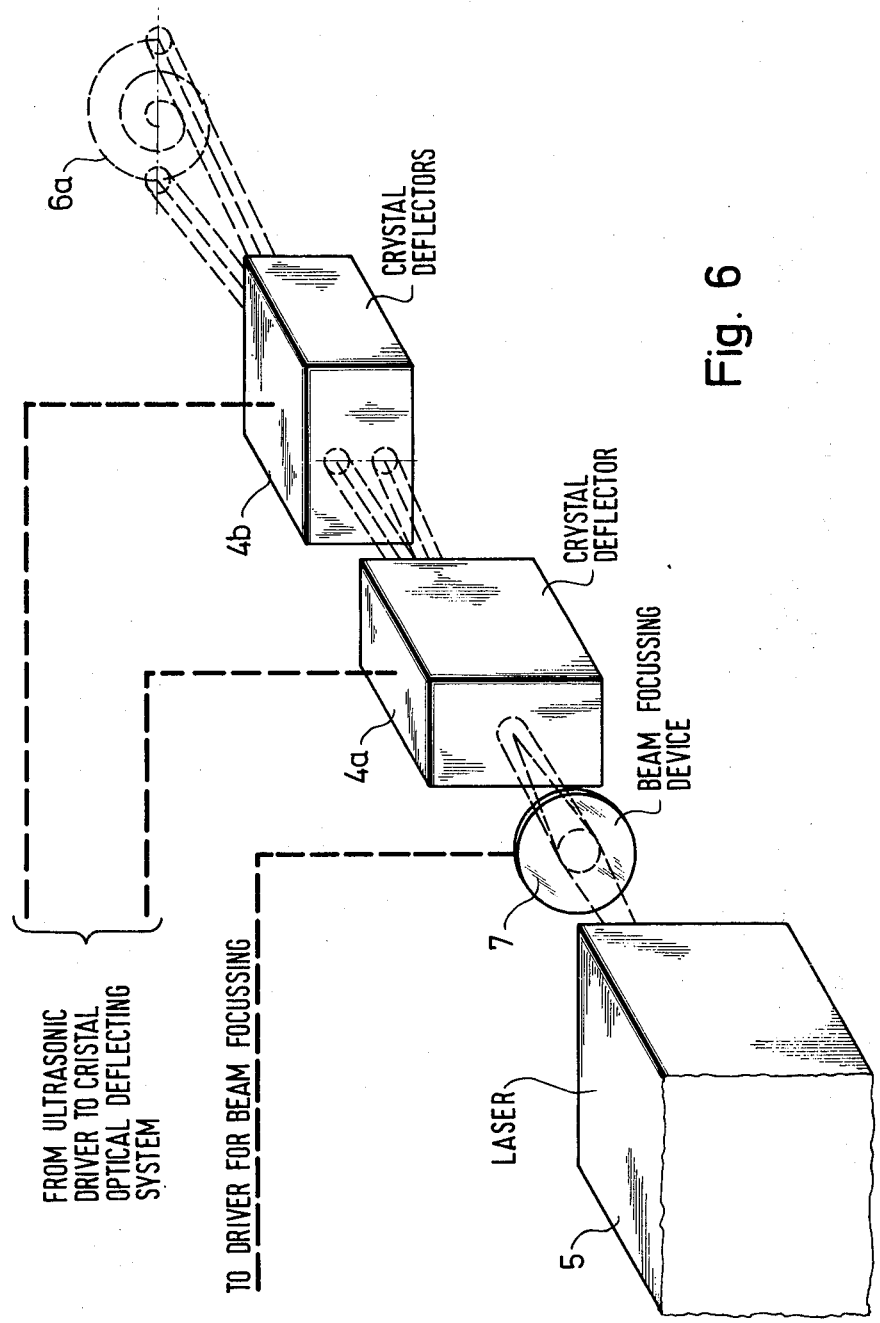
Figure 7:
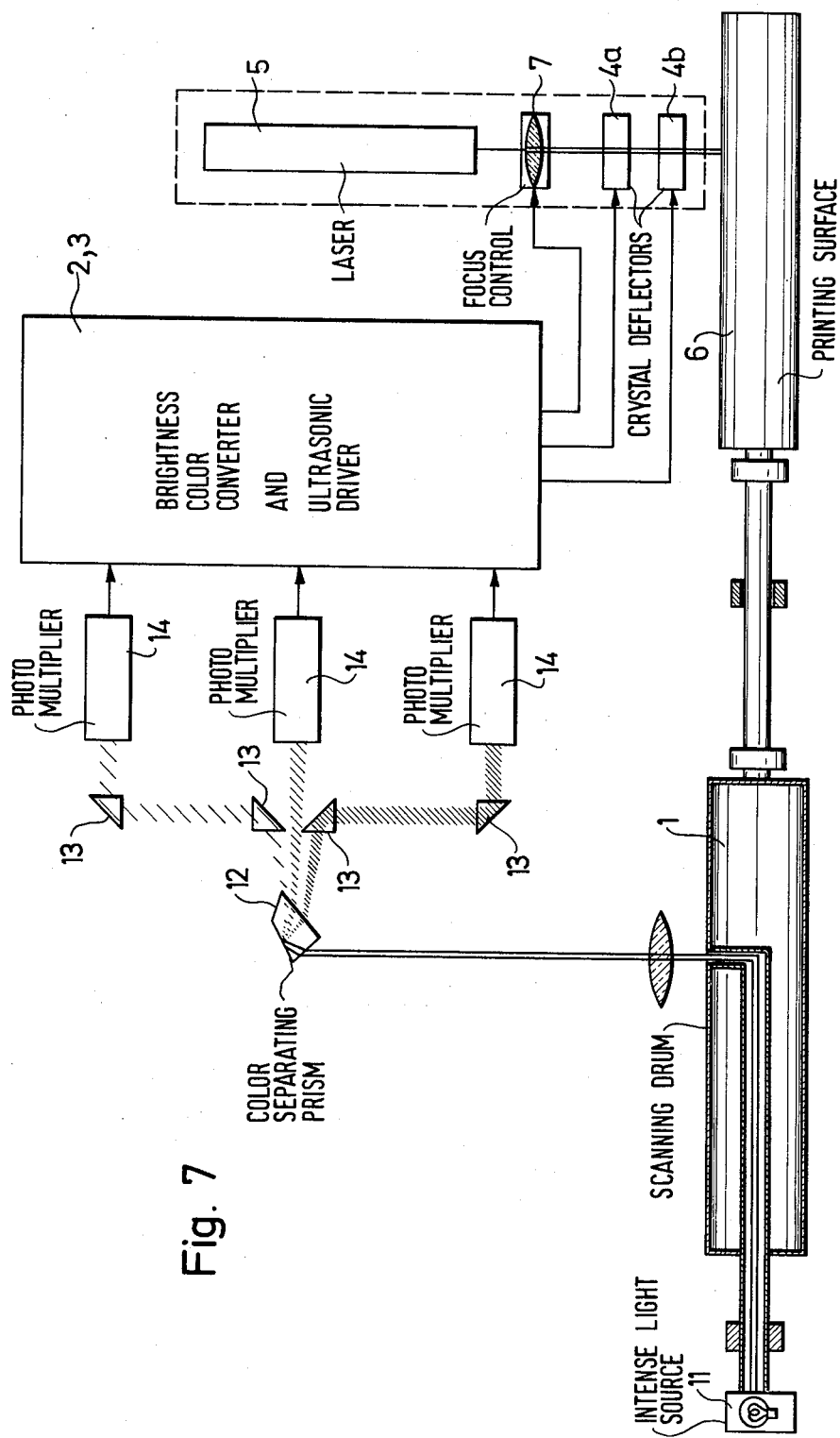

A more detailed understanding and appreciation of the invention can be obtained from the following detailed description taken in conjunction with the accompanying drawings of which:

FIG. 1 illustrates the path of the etching beam in the exemplary embodiment on a quadratic etching cell of medium tone gradation, FIG. 2 illustrates the path of the etching beam in the exemplary embodiment on a quadratic etching cell of deep shadow tone gradation, FIG. 3 is a sectional view of the upper region of the printing surface in the area of the etching cell of FIG. 1, FIG. 4 is a sectional view similar with FIG. 3 for the engraving cell of FIG. 2, FIG. 5 is a schematic representation of the units of an etching apparatus operating in accordance with an exemplary embodiment of the invention, FIG. 6 is a schematic representation similar to FIG. 5 which shows another exemplary embodiment of an installation for controlling the etching beam, FIG. 7 is a schematic representation of an exemplary embodiment of an apparatus which can be used for the performance of the exemplary embodiment of a method according to the invention, said apparatus having a known basic structure, per se, and FIG. 8 is a perspective part view of the apparatus shown in FIG. 7.

FIGS. 1 and 2 schematically explain the principle of an exemplary embodiment of the invention under the supposition of a spiral traversing path of a sequence of etching beam impulses (e.g. of equal contents of energy) on the area of an etching cell. Thereby the circles shall show the etching area of the sequential beam impulses, all areas being of equal size due to the supposed constancy of energy, and the dotted line symbolizes the spiral traversing path of the etching beam impulses. If it is desired to make an etching cell which corresponds to a medium tone gradation in the original and has about the etching depth according to FIG. 3, the increment of radius (a) is given a large value so that the area of the etching cell is traversed in only a few spiral cycles (n). On the other hand, in the case of an etching cell of, for example maximal etching depth according to FIG. 4, said depth corresponding to a shadow tone in the original, the spiral cycles are close to one another, and a correspondingly larger number of etching beam impulses impinge the area of the engraving cell as it is shown by FIG. 2.

FIGS. 5–8 show the schematic structure of an exemplary beam controlling apparatus which is adapted for the performance of an exemplary embodiment of the invention. As should now be understood, the invention differs from known installations for controlling the beam effectiveness in etching processes in that the etching beam is principally modulated as to its traversing path length or spatial distribution density across the area of the etching cell and not as to its energy and/or frequency, between the beam source and the printing area to be etched. Accordingly, an acusto-optical beam control system is used instead of the usual electronic one.

According to an already mentioned, further exemplary embodiment of the invention, the beam control system can be supplemented by an arrangement for focusing the beam.

In FIGS. 5–8, similar groups of the apparatus are designated by the same reference numerals. Thus, the basic structural parts of the beam control system according to the invention are the scanning device or means 1 which scans the original, and delivers brightness signals which are modulated according to the tone gradation, the brightness signal converter or transformer means 2 having an output comprising electric signals in either analog or digital form, the ultrasonic driving device or means 3 which transforms said electric signals in two, e.g., sin $\alpha$ and cos $\alpha$ signals of which each is separately transmitted to two, for example crystal-optical deflecting systems 4a and 4b which deflect an $CO_2$ laser beam, for example, provided by a beam source 5 in two 90° coordinates and thereby force said beam to perform the spiral traversing path 6a on the area of an engraving cell on the, printing area 6 as explained above.

The magnitude of the sin$\alpha$ and cos$\alpha$ signals is controlled by the ultrasonic driver 3 in accordance with the brightness signal output of converter 2 such that the pitch or incremental radius of the spiral path of the energy beam is a variable controlled by the brightness signal.

It may be repeated in this connection that the number of beam impulses of constant energy which are directed on the area of an engraving cell is constant for all sequential cells, that is, the beam transition from one cell to the next one happens in constant time intervals. In case of full shadow cells the total series of impulses works on the cell area, while in case of those cells which correspond to weaker tone gradations the traversing path of the beam supercedes the extent of the cell area and, as far as it is outside of said areas, enters the area of a mask which is arranged within the deflecting system 4a, 4b and absorbs the surplus beam impulses.

In the further exemplary embodiment of the invention shown in FIGS. 6 and 7, the ultrasonic driver device 3 controls not only the two beam deflecting systems 4a 4b, but — under specific conditions for example in case of cells coordinated with extreme tone gradations — additionally also influences a beam focusing device 7 which may be equipped for example with an optical system adapted to be modulated as to its focal length. Said device 7 modulates the cross-section of the beam and thereby the intensity of the energy working on the units of area of the cell impinged by said beam impulse, so that the extent of the heat energy dissipated into the mass of the cylinder becomes more influential because it is codeterminative as to the etching effect.

FIGS. 7 and 8 show an exemplary installation which is useful for the performance of the invention and has a known structure with respect to the synchronous drive of the scanning device 1 and the printing cylinder 6 and for the supplemental installations for providing color separations. The scanning drum 1 carrying the film original is connected to the exposing drum 16 which carries the film material for each color separation by a "lead screw" encompassed by an internally threaded nut. There are three easily exchangeable "screws" or respective spindles of which the pitches provide advance drives of 350, 500, or 1000 lines to 25, 1 mm. The total installation is rotated by a synchronous motor 8 at constant speed. The rotating lead screw is axially displaced under the influence of the threaded nut, and said displacement is transferred to the optical apparatus carried thereby.

The "white" scanning beam is delivered by an intensive light source 11 and bundled to form a narrow light beam which scans the transparency of the original because of the rotation of the drum 1 in connection with the axial displacement of the optical carrier. The scanning beam which is modulated in its brightness in said manner is spectrally separated in the color portions Blue, Green, and Red by a prism 12. Said color portions are distributed — partially by aid of mirror elements 13 — on three photomultipliers which transform the received light signals in equivalent electric values. Accordingly, the before-described scanning system transforms the transparency values of the picture original into electronic computer language whereby the three signals correspond to the separations Yellow, Magenta, and Cyan for the reproduction.

It should now be apparent that in the case of a black and white picture original, the prism 12 acting as color divider, may be omitted and the carrier drum 6 for the three color separation films may be reduced to carry a single black and white film.

The apparatus groups 2 to 4a, 4b inclusive shown on the right side of FIG. 7 correspond to the system parts which are described further above in connection with FIG. 5 as to structure and kind of operation. Accordingly, they need no repeated explanation.

Summarizing, the invention comprises a novel method for the original, true modulation of the etching effect of an energy and especially laser beam for the preparation of a screened rotogravure printing plate, said method being characterized in that the etching effect of the etching beam is not adapted to the tone gradation of the original by principally modulating the energy and/or frequency of the beam as it is hitherto known, but, rather, by modulation of the duration (by controlling the spatial distribution density of the energy beam path) of the etching influence on the individual engraving cells of the beam of which the energy contents are principally kept constant. Within the scope of the generic invention there are additional, that is auxiliary measures to somewhat modulate the energy and/or frequency of the etching beam and/or to vary its cross-section.

Although only a few embodiments of the invention have been explained in detail above, those in the art will recognize that many variatuons and/or modifications may be made in the exemplary embodiments without departing from the spirit and improved advantages of the invention. Accordingly, all such variations and modifications are to be considered within the scope of this invention.

What is claimed is:

1. A method of engraving printing plates by means of energy beams to obtain multisteps of degree of engravement up to a substantially continuous engraving effect, said method comprising:

providing an energy beam which, with respect to its energy and frequency, is modulated at most only to small degree, focusing said beam to a fraction of the maximum dimention of an engraved cell, etching the surface of the individual engraved cells by means of said focused beam along a beam path, and modulating the length and spatial distribution density of the beam path on the cell surface in accordance with the tone intensity of a corresponding point of an original picture with which the respective cell of the printing plate is associated.

2. The method according to claim 1 further comprising modulating the beam focus in addition to the modulation of the beam path.

3. The method according to claim 1, including the displacing of the etching beam, in equal time intervals, from one cell position to another, while controlling the beam to act upon each individual cell during such portion of the time interval only which is required for the beam to travel the respective path for such cell; while for the rest of the time interval excluding the beam from the cell.

4. The method according to claim 3 further comprising selecting the displacement time interval to be of a magnitude equal to the duration of etching required to produce an engraved cell of maximum volume.

5. The method according to claim 1, wherein said etching step includes etching the surface of each individual engraved cell along a spiral path originating from the central region of said cell.

6. The method according to claim 5, further comprising etching the surface of the individual cells along a spiral path or track, the pitch of which increases in outward direction.

7. The method according to claim 1, further comprising repeatedly processing the surface of one and the same individual cell in at least partial areas thereof with the etching beam before processing the next cell.

8. The method according to claim 7, including processing the surface of each single cell by means of the etching beam along a beam path and controlling at least part of the adjacent path portions to have a spacing from each other which is smaller than the diameter of the etching beam.

9. A method for successively engraving elemental areas on a printing surface with an energy beam, said method comprising:

providing an energy beam having its maximum cross-section dimensions small than the maximum dimension of an elemental area to be engraved, generating tone intensity signals representing the tone gradation of an original at successive areas corresponding to said elemental areas to be engraved on said printing surface, successively scanning said energy beam from the location of one elemental area to another on said printing surface in synchronism with said tone intensity signals representing respectively corresponding successive areas on said original, and while said energy beam is positioned at the location of a given elemental area, further scanning said beam within that elemental area along a path having a spatial distribution density and time duration therewithin which are controlled in accordance with the tone intensity signals thereby causing the degree of engravement within the elemental area to correspond with the tone gradation of the respectively associated area of said original.

10. A method as in claim 9, wherein said further scanning of the beam comprises moving the beam along a spiral path originating from the central region of the elemental area, the pitch of said pitch of said spiral path and hence its spatial distribution desnity being controlled in accordance with the tone intensity signals.

11. A method as in claim 9, wherein said further scanning step comprises modulating the cross-sectional area of said beam in addition to controlling the beam path.

12. A method as in claim 9 wherein said further scanning of the beam comprises moving the beam along a controlled ever widening trajectory originating from the central region of the elemental area and masking out the beam whenever it's trajectory exceeds the boundaries of the elemental area.

13. A method as in claim 12, wherein said successively scanning step comprises displacing the beam from the location of one elemental area location to another at substantially equal time intervals.

14. A method as in claim 13, including the step of controlling said equal time intervals to correspond to the duration of engravement required to produce an engraved elemental area of maximum volume.

15. Apparatus for engraving elemental areas on a printing surface with an energy beam, said apparatus comprising:

means for providing an energy beam having a maximum cross-sectional dimension smaller than the maximum dimension of an elemental area to be engraved, means for generating tone intensity signals representing the tone gradation of an original at successive areas corresponding to said elemental areas to be engraved on said printing surface, means for successively scanning energy beam from the location of one elemental area to another on said printing surface in synchronism with said tone intensity signals representing respectively corresponding successive areas on said original, and means for further scanning said beam within an elemental area, while it is positioned thereat, along a path having a spatial distribution density and time duration therewithin that is controlled in accordance with the tone intensity signals thereby causing the degree of engravement within the elemental area to correspond with the tone gradation of the respectively associated area of said original.

16. Apparatus as in claim 15, wherein said means for further scanning comprises means for moving the beam along a controlled ever-widening trajectory originating from the central region of the elemental area and means for masking out the beam whenever its trajectory exceeds the boundaries of the elemental area.

17. Apparatus as in claim 15, wherein said means for further scanning comprises means for modulating the cross-sectional area of said beam in addition to controlling the beam path.

18. Apparatus as in claim 15, wherein said means for further scanning comprises means for moving the beam along a spiral path originating from the central region of the elemental area and means for controlling the pitch of the spiral path in accordance with the tone intensity signals.

19. Apparatus as in claim 18, wherein the energy beam is a laser beam and the means for moving comprises electrically controlled crystal deflectors placed in the path of said laser beam.

* * * * *